US011991711B2

United States Patent
Takahashi et al.

(10) Patent No.: US 11,991,711 B2
(45) Date of Patent: May 21, 2024

(54) TERMINAL AND RADIO COMMUNICATION METHOD

(71) Applicant: NTT DOCOMO, INC., Tokyo (JP)

(72) Inventors: Hideaki Takahashi, Tokyo (JP); Kazuki Takeda, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 417 days.

(21) Appl. No.: 17/284,092

(22) PCT Filed: Oct. 3, 2019

(86) PCT No.: PCT/JP2019/039077
§ 371 (c)(1),
(2) Date: Apr. 9, 2021

(87) PCT Pub. No.: WO2020/075618
PCT Pub. Date: Apr. 16, 2020

(65) Prior Publication Data
US 2021/0360678 A1    Nov. 18, 2021

(30) Foreign Application Priority Data

Oct. 10, 2018   (JP) .................................. 2018-202309

(51) Int. Cl.
*H04W 72/12* (2023.01)
*H04L 1/00* (2006.01)
(Continued)

(52) U.S. Cl.
CPC .......... *H04W 72/23* (2023.01); *H04L 1/0061* (2013.01); *H04W 24/10* (2013.01); *H04W 72/0453* (2013.01); *H04W 72/0466* (2013.01)

(58) Field of Classification Search
CPC . H04W 72/23; H04W 24/10; H04W 72/0453; H04W 72/0466; H04W 72/12;
(Continued)

(56) References Cited

U.S. PATENT DOCUMENTS

2019/0158205 A1*  5/2019  Sheng ................... H04L 5/0048
2020/0022161 A1*  1/2020  Yang ..................... H04L 5/0064
(Continued)

FOREIGN PATENT DOCUMENTS

EP    3820216 A1    5/2021
EP    3860067 A1    8/2021
(Continued)

OTHER PUBLICATIONS

Office Action issued in Taiwanese Application No. 108136325; dated Nov. 21, 2022 (18 pages).
(Continued)

*Primary Examiner* — Eunsook Choi
(74) *Attorney, Agent, or Firm* — Osha Bergman Watanabe & Burton LLP

(57) ABSTRACT

A terminal is disclosed including a receiver that monitors a common search space to receive downlink control information for scheduling a downlink shared channel; and a processor that controls a maximum number of resource blocks assignable by the downlink control information based on whether a control resource set is configured by a parameter that is in a master information block (MIB). In other aspects, a radio communication method, a base station, and a system are also disclosed.

5 Claims, 8 Drawing Sheets

(51) Int. Cl.
  *H04W 24/10* (2009.01)
  *H04W 72/044* (2023.01)
  *H04W 72/0453* (2023.01)
  *H04W 72/23* (2023.01)
  *H04W 72/04* (2023.01)

(58) Field of Classification Search
  CPC ...... H04W 72/20; H04L 1/0061; H04L 5/001;
                                              H04L 5/0053
  See application file for complete search history.

(56) References Cited

U.S. PATENT DOCUMENTS

| | | |
|---|---|---|
| 2020/0067690 A1 | 2/2020 | Park et al. |
| 2020/0092799 A1* | 3/2020 | Xu .................... H04W 24/08 |
| 2021/0282122 A1 | 9/2021 | Takahashi et al. |
| 2021/0360665 A1 | 11/2021 | Takahashi et al. |
| 2021/0377950 A1 | 12/2021 | Takahashi et al. |

FOREIGN PATENT DOCUMENTS

| | | |
|---|---|---|
| EP | 3860247 A1 | 8/2021 |
| WO | 2018159999 A1 | 9/2018 |

OTHER PUBLICATIONS

Office Action issued in Indian Application No. 202117019709; dated Dec. 11, 2022 (5 pages).
Office Action issued in counterpart Chinese Patent Application No. 201980067353.4 dated Apr. 23, 2023 (19 pages).
Office Action issued in counterpart European Patent Application No. 19872134.2 dated Apr. 24, 2023 (5 pages).
Office Action issued in counterpart Saudi Arabian Patent Application No. 521421697 dated May 11, 2023 (10 pages).
3GPP TS 38.213 V15.3.0; "3rd Generation Partnership Project; Technical Specification Group Radio Access Network; NR; Physical layer procedures for control (Release 15)"; Sep. 2018 (101 pages).
3GPP TS 38.214 V15.3.0; "3rd Generation Partnership Project; Technical Specification Group Radio Access Network; NR; Physical layer procedures for data (Release 15)"; Sep. 2018 (96 pages).
3GPP TS 38.331 V15.3.0; "3rd Generation Partnership Project; Technical Specification Group Radio Access Network; NR; Radio Resource Control (RRC) protocol specification (Release 15)"; Sep. 2018 (445 pages).
Notice of Reasons for Refusal issued in Japanese Application No. 2020-550533 dated Sep. 13, 2022 (7 pages).
Office Action issued in African Application No. AP/P/2021/013144 dated Oct. 13, 2022 (4 pages)
International Search Report issued in PCT/JP2019/039077 dated Nov. 12, 2019 (2 pages).
Written Opinion of the International Searching Authority issued in PCT/JP2019/039077 dated Nov. 12, 2019 (4 pages).
Ericsson; "Bandwidth configuration for initial DL BWP"; 3GPP TSG-RAN WG2#103bis, Tdoc R2-1814978; Chengdu, China; Oct. 8-12, 2018 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
TSG-RAN WG1 #94bis; R1-1811864 "Summary of 7.1.3.1 (DCI contents and formats)" Ericsson; Chengdu, China; Oct. 8-12, 2018 (13 pages).
3GPP TSG-RAN WG1 Meeting #94bis; Tdoc R1-1811488 "Maintenance issues of physical downlink control channel" Ericsson; Chengdu, China; Oct. 8-12, 2018 (13 pages).
3GPP TSG RAN WG1 Meeting #94; R1-1809144 "Maintenance for carrier aggregation and bandwidth parts" NTT DOCOMO, Inc.; Gothenburg, Sweden; Aug. 20-24, 2018 (21 pages).
Extended European Search Report issued in European Application No. 19872134.2, dated May 13, 2022 (12 pages).
MediaTek Inc., "Summary of Bandwidth Part Remaining Issues", 3GPP TSG RAN WG1 Meeting #94bis, R1-1811893, Chengdu, China, Oct. 8-12, 2018; cited in the International Search Report dated Nov. 12, 2019, which was filed in the Information Disclosure Statement dated Apr. 9, 2021 (27 pages).
Office Action issued in Chinese Application No. 201980067353.4; dated Sep. 20, 2023 (15 pages).
Office Action issued in counterpart European Patent Application No. 19 872 134.2 mailed on Feb. 26, 2024 (6 pages).
NTT Docomo, Inc. et al; "Bandwidth configuration for basic BWP operation"; 3GPP TSG-RAN WG2 #102, R2-1807390; Busan, Korea; May 21-25, 2018 (3 pages).

* cited by examiner

TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of LTE (Long-Term Evolution) have been drafted for the purpose of further increasing high speed data rates, providing lower latency and so on (see Non-Patent Literature 1). In addition, for the purpose of further high capacity, advancement and the like of the LTE (3GPP (Third Generation Partnership Project) Rel. (Release) 8 and Rel. 9), the specifications of LTE-Advanced (3GPP Rel. 10 to Rel. 14) have been drafted.

Successor systems of LTE (e.g., referred to as "5th generation mobile communication system)," "5G+ (plus)," "NR (New Radio)," "3GPP Rel. 15 (or later versions)," and so on) are also under study.

In an initial access in NR, at least one of detection of a synchronization signal block (SSB), acquisition of broadcast information (e.g., master information block (MIB)) transmitted by a broadcast channel (also referred to as a "broadcast channel (PBCH (Physical Broadcast Channel))," "P-BCH," and so on), and establishment of a connection by random access is performed.

Here, the SSB is a signal block including at least one of synchronization signals (e.g., a primary synchronization signal (PSS), a secondary synchronization signal (SSS) and a PBCH and is also referred to as a "SS/PBCH block," and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (hereinafter also referred to as "NR"), it is assumed that control resource sets (CORESETs) (also referred to as "CORESET #0," "type 0-PDCCH CSS," and so on) for a search space (common search space (CSS)) which is common to one or more user terminals (UEs (User Equipments)) are configured for the UEs. For example, it is studied that CORESET #0 is configured based on a parameter (e.g., pdcch-ConfigSIB1) in an MIB.

However, if CORESET #0 is not configured based on a parameter (e.g., pdcch-ConfigSIB1) in an MIB, a frequency domain of a downlink shared channel (e.g., PDSCH) scheduled by given downlink control information (DCI) monitored by the CSS may not be specified appropriately. As a result, the UEs may not appropriately control a receiving process (e.g., at least one of reception, demodulation, decoding, rate matching, and so on) of the downlink shared channel.

Thus, an object of the present disclosure is to provide a user terminal and a radio communication method that can appropriately control a receiving process of a downlink shared channel.

Solution to Problem

A terminal according to one aspect of the present disclosure includes a receiving section that monitors a common search space and receives a downlink control information used for scheduling a downlink shared channel, and a control section that controls resource blocks assignable by the downlink control information based on whether a control resource set is configured by a parameter that is in a master information block (MIB).

Advantageous Effects of Invention

According to one aspect of the present disclosure, it is possible to appropriately control a receiving process of a downlink shared channel.

DESCRIPTION OF EMBODIMENTS

Figure 1:
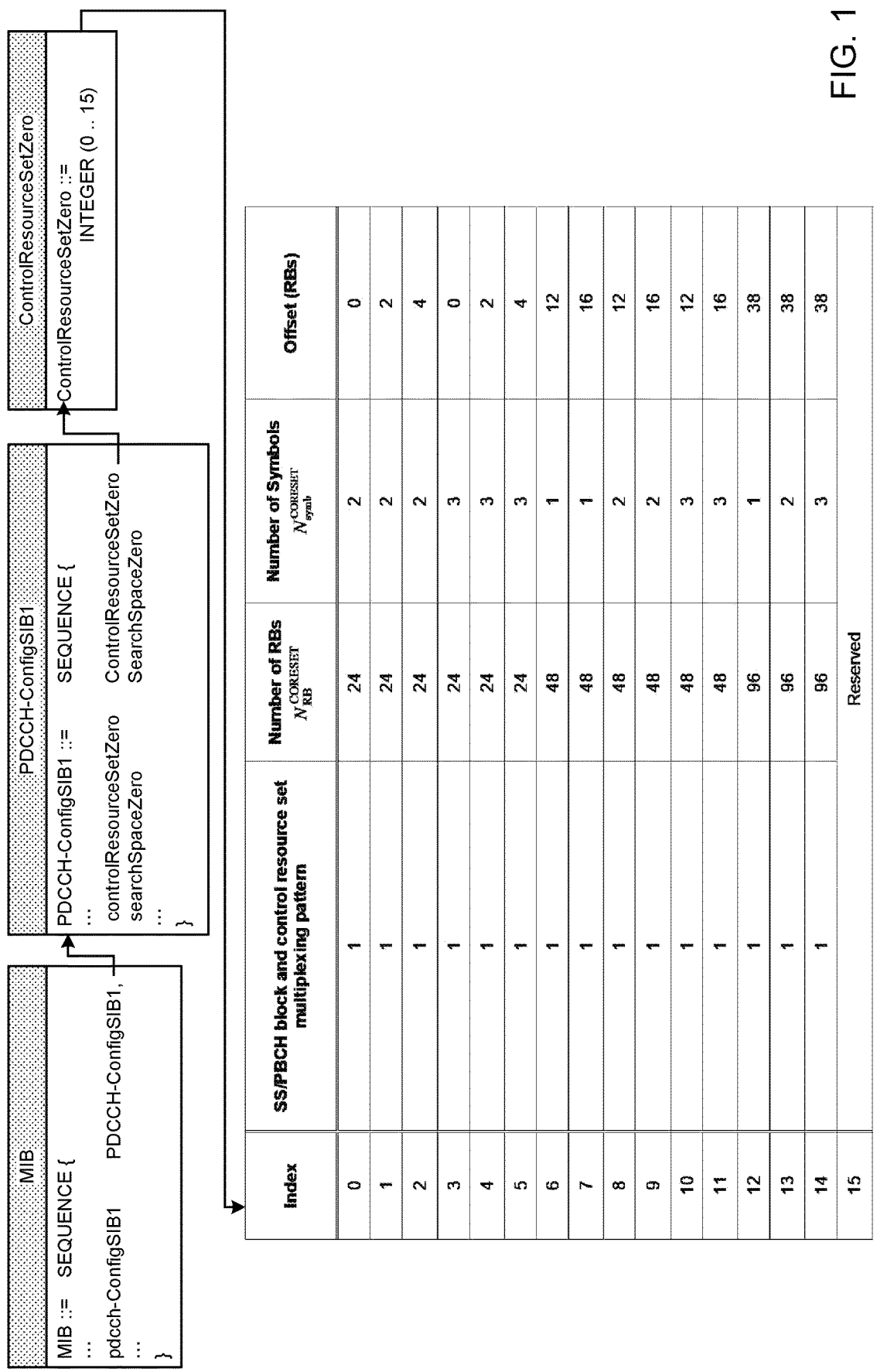
FIG. 1 is a diagram to show an example of a configuration of CORESET #0 based on an MIB.

In an initial access in future radio communication systems (hereinafter, also referred to as "NR"), at least one of detection of a synchronization signal block (SSB), acquisition of broadcast information (e.g., master information block (MIB)) transmitted by a broadcast channel (also referred to as a "broadcast channel (PBCH (Physical Broadcast Channel))," "P-BCH," and so on), and establishment of a connection by random access is performed.

Here, the SSB is a signal block including at least one of synchronization signals (e.g., a primary synchronization signal (PSS), a secondary synchronization signal (SSS) and a PBCH and is also referred to as a "SS/PBCH block," and so on.

In NR, a user terminal (UE) performs monitoring (blind decoding) of a search space (SS) to detect (CRC scrambled) DCI having cyclic redundancy check (CRC) bits scrambled with a given RNTI (Radio Network Temporary Identifier).

The SS may include a search space (common search space (CSS)) used for the monitoring of (cell-specific) DCI which is common to one or more UEs and a search space (user-specific search space (USS)) used for the monitoring of DCI specific to the UE.

For example, the CSS may include at least one of the following.
  type 0-PDCCH CSS
  type 0A-PDCCH CSS
  type 1-PDCCH CSS
  type 2-PDCCH CSS
  type 3-PDCCH CSS The type 0-PDCCH CSS is also referred to as an "SS for the system information," (for example, SIB (System Information Block) 1, RMSI (Remaining Minimum System Information), and the like. The type 0-PDCCH CSS may be a search space for the DCI which is CRC-scrambled with an SI-RNTI (System Information-Radio Network Temporary Identifier) (search space for the monitoring of the DCI which schedules downlink shared channel (PDSCH (Physical Downlink Shared Channel)) transmitting an SIB1).

The type 0A-PDCCH CSS is also referred to as an "SS for OSI (Other System Information)," and the like. The type 0A-PDCCH CSS may be a search space for the DCI which is CRC-scrambled with the SI-RNTI (search space for the monitoring of the DCI which schedules a PDSCH transmitting the OSI).

The type 1-PDCCH CSS is also referred to as an "SS for random access (RA)," and the like. The type 1-PDCCH CSS may be a search space for the DCI which is CRC-scrambled which a RA-RNTI (Random Access-RNTI), a TC-RNTI (Temporary Cell-RNTI) or a C-RNTI (Cell-RNTI)) (search space for the monitoring of the DCI which schedules a PDSCH transmitting a message for an RA procedure (for example, Random Access Response (RAR, message 2), message for the contention resolution (message 4))).

The type 2-PDCCH CSS is also referred to as an "SS for paging," and the like. The type 2-PDCCH CSS may be a search space for the DCI which is CRC-scrambled with a P-RNTI (Paging-RNTI) (search space for the monitoring of the DCI which schedules a PDSCH transmitting the paging).

The type 3-PDCCH CSS may be a search space for the DCI which is CRC scrambled with, for example, an INT-RNTI (Interruption RNTI) for DL preemption indication, an SFI-RNTI (Slot Format Indicator RNTI) for the slot format indication, a TPC-PUSCH-RNTI for transmit power control (TPC) of the PUSCH (Physical Uplink Shared Channel), a TPC-PUCCH-RNTI for the TPC of the PUCCH (Physical Uplink Control Channel), a TPC-SRS-RNTI for the TPC of the SRS (Sounding Reference Signal), a C-RNTI, a CS-RNTI (Configured Scheduling RNTI) or an SP-CSI-RNTI (Semi-Persistent-CSI-RNTI)).

A control resource set (CORESET) is associated with these CSSs. The CORESET is allocation candidate regions of a downlink control channel (for example, PDCCH (Physical Downlink Control Channel)) transmitting the DCI.

The CORESET for the CSS configured by particular parameters (for example, ControlResourceSetZero) signaled with higher layer signaling is also referred to as "CORESET #0," "CORESET0," "common CORESET," and the like. Note that CORESET #0 may be CORESET for the type 0-PDCCH CSS.

FIG. 1 is a diagram to show an example of a determination of CORESET #0 based on an MIB. As shown in FIG. 1, the MIB may include configuration information (also referred to as "pdcch-ConfigSIB1" or "RMSI-PDCCH-Config," and the like) related to the PDCCH for the system information (for example, SIB1 or RMSI, and the like). Note that parameters in the MIB and the hierarchy structure of the parameters shown in FIG. 1 are only examples, and some parameters (layers) may be omitted or may be added.

As shown in FIG. 1, pdcch-ConfigSIB1 in the MIB may include information (also referred to as "ControlResourceSetZero," "the given number of Most significant bit(s) (MSB)" (for example, 4 MSB)) used for the configuration of CORESET #0.

For example, in FIG. 1, the UE may determine a bandwidth (the number of RBs) of CORESET #0, based on the number of resource blocks ($N^{CORESET}_{RB}$) (also referred to as RB (Resource Block), physical resources block (PRB), and the like), associated with the index indicated by ControlResourceSetZero in pdcch-ConfigSIB1.

Note that, in the present specification, the "number of the RBs," "size," "bandwidth," and "frequency domain" are used interchangeably, and may be expressed in other words mutually.

Incidentally, the UE is able to not configure CORESET #0, based on pdcch-ConfigSIB1 in the MIB. For example, since, in a particular cell, the PBCH (MIB) is broadcasted but the system information (for example, SIB1, RMSI) is not broadcasted, then CORESET #0 does not need to be configured.

For example, the particular cell may be a primary secondary cell (PSCell) or secondary cell (SCell) without the SSB, a cell for NR of non-standalone (NSA) (for example, EN-DC (E-UTRA-NR Dual Connectivity), NE-DC (NR-E-UTRA Dual Connectivity), and the like).

In this way, in NR, it is also assumed that CORESET #0 is not configured based on pdcch-ConfigSIB1 in the MIB. If CORESET #0 is not configured based on pdcch-ConfigSIB1 in the MIB, the UE may not recognize in which frequency domain the PDSCH scheduled with given DCI (for example, DCI format 1_0 detected in the above-described CSS and CRC-scrambled with a particular RNTI) is transmitted.

Specifically, if the DCI (for example, DCI format 1_0) which is CRC-scrambled with a particular RNTI (for example, P-RNTI, SI-RNTI, RA-RNTI, C-RNTI or TC-RNTI) is detected in the CSS, the UE assumes that numbering of RBs (RB numbering) for the PDSCH scheduled with the DCI starts from the lowest RB in CORESET where the DCI is received. The UE assumes that the maximum number of the RBs assignable by the DCI is given by the size of CORESET #0.

However, if CORESET #0 is not configured based on pdcch-ConfigSIB1 in the MIB, as a result of not being able to recognize the frequency domain allocated to CORESET #0, the UE may not recognize in which frequency domain the PDSCH scheduled with given DCI (for example, DCI format 1_0 detected in the above-described CSS and CRC-scrambled with a particular RNTI) is transmitted.

Thus, the inventors have studied a method to appropriately specify a frequency domain in which a PDSCH scheduled with given DCI (for example, DCI format 1_0 detected in the above-described CSS and CRC-scrambled with a particular RNTI) is transmitted even if CORESET #0 is not configured based on pdcch-ConfigSIB1 in an MIB, and have resulted in the present invention.

One embodiment of the present disclosure will be described in detail with reference to the drawings as follows.

First Aspect

In a first aspect, a UE may control at least one of RB numbering for a PDSCH scheduled by given DCI and the maximum number of RBs assignable by the given DCI, based on whether or not CORESET #0 is configured.

For example, the given DCI may be DCI of DCI format 1_0 that is CRC-scrambled with a particular RNTI (for example, P-RNTI, SI-RNTI, RA-RNTI, C-RNTI, CS-RNTI or TC-RNTI) and monitored (detected) with a CSS.

In the first aspect, if CORESET #0 is not configured, the UE may control at least one of the above-described RB numbering and the above-described maximum number of RBs, based on a common CORESET.

Here, the common CORESET is a CORESET for the CSS. For example, the common CORESET may be used for the DCI which schedules at least one of RAR, paging, system information, and the like. The common CORESET may be a CORESET for at least one of type 0A-PDCCH CSS, type 1-PDCCH CSS, type 2-PDCCH CSS, and type 3-PDCCH CSS.

The common CORESET may be given an identifier (control resource set ID) except 0 (zero). In this way, the common CORESET may be configured in addition to CORESET #0.

Figure 2:
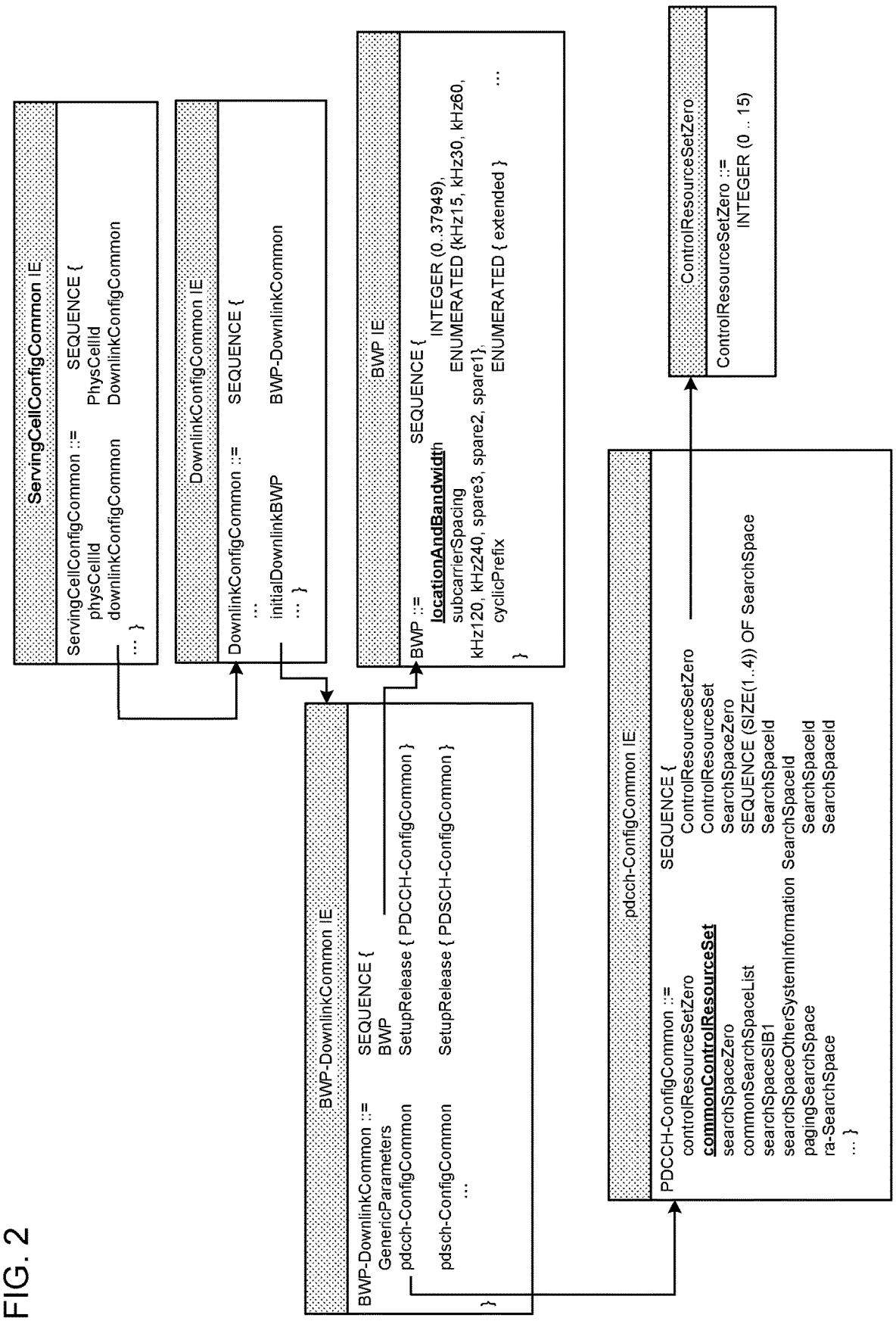
FIG. 2 is a diagram to show an example of an RRC reconfiguration message.

The common CORESET may be configured based on an RRC reconfiguration message or the SIB1. FIG. 2 is a diagram to show an example of an RRC reconfiguration message.

As shown in FIG. 2, configuration information (ServingCellConfigCommon) specific to a serving cell (cell, component carrier) in the RRC reconfiguration message may include configuration information (DownlinkConfigCommon) that is common to the downlink. DownlinkConfigCommon may include information (initialDownlinkBWP) related to an initial downlink BWP (described later). For the initial downlink BWP, a cell-specific common parameter (BWP-DownlinkCommon) may be provided.

BWP-DownlinkCommon may include cell-specific configuration information (PDCCH-ConfigCommon) related to the PDCCH, and PDCCH-ConfigCommon may include information (commonControlResourceSet) used for the configuration of the common CORESET.

commonControlResourceSet may include information (frequencyDomainResources) indicating the frequency domain resource of the common CORESET. The UE may determine the lowest RB in the common CORESET and the size (bandwidth, the number of RBs) of the common CORESET, based on frequencyDomainResources.

Note that hierarchy structure of the parameters shown in FIG. 2 is only an example, and is by no means limited to those illustrated. For example, although, in FIG. 2, information (for example, BWP-DownlinkCommon given for initialDownlinkBWP) about the initial downlink BWP is included in ServingCellConfigCommon, the information about the initial downlink BWP may be included in any information element (IE) of any hierarchy. For example, the information about the initial downlink BWP may be included in the SIB1 (for example, DownlinkConfigCommonSIB in ServingCellConfigCommonSIB in the SIB1).

Figure 3:
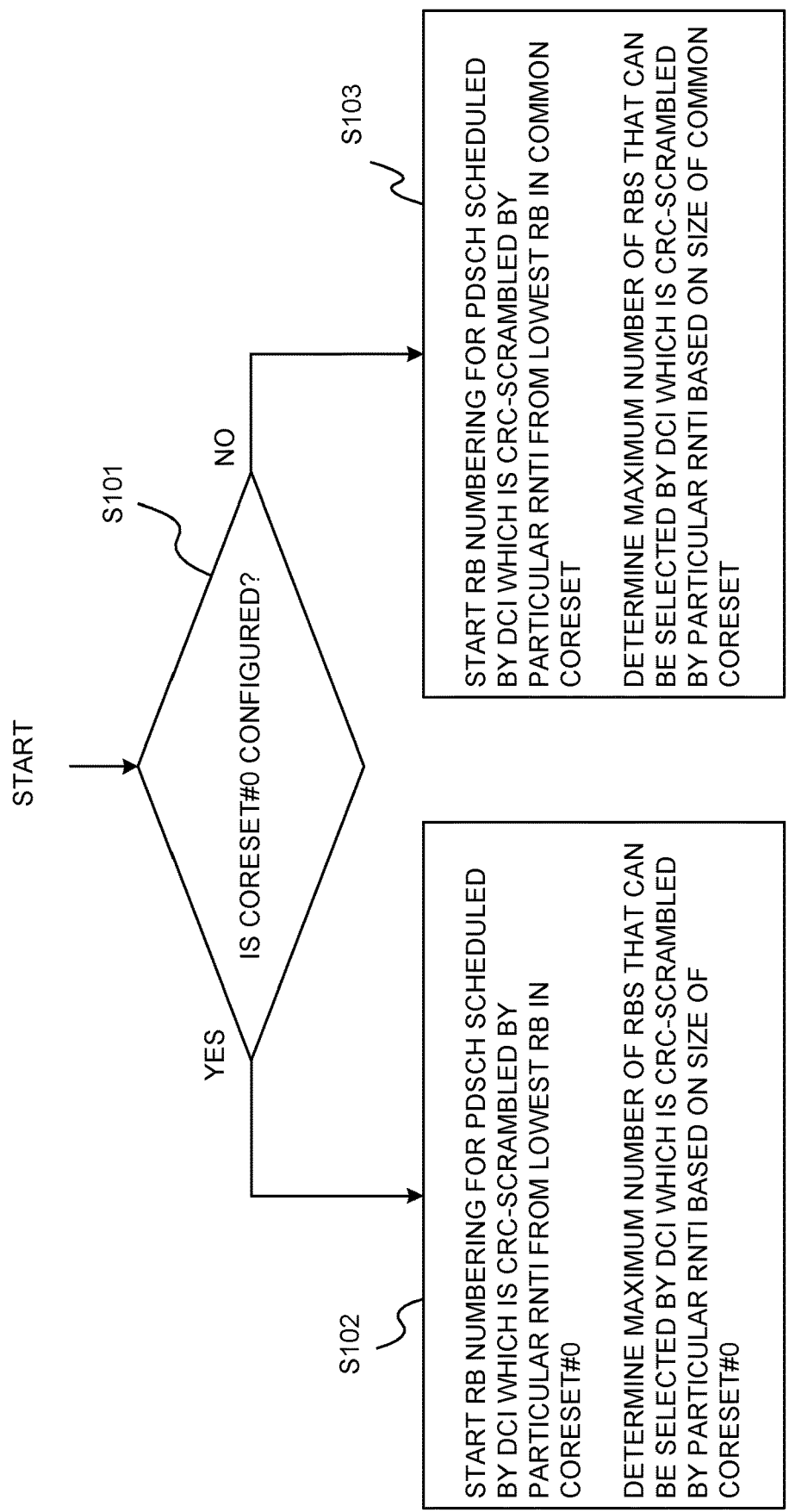
FIG. 3 is a diagram to show an example of control of RB numbering and the maximum number of RBs according to a first aspect.

FIG. 3 is a diagram to show an example of control of the RB numbering and the maximum number of RBs according to the first aspect. In step 101 of FIG. 3, the UE may determine whether or not CORESET #0 is configured. CORESET #0 may be configured based on the MIB (for example, ControlResourceSetZero in pdcch-ConfigSIB1 of FIG. 1).

If CORESET #0 is configured for the UE (step S101, Yes), in step S102, the UE may start RB numbering for the PDSCH scheduled by the above-described given DCI (for example, DCI format 1_0 that is CRC-scrambled with a particular RNTI and is monitored in CSS) from the lowest RB in CORESET #0.

Here, the RB numbering is to give an index (or a number) to each RB in the given bandwidth. In step S102, the UE may give indexes (or numbers) in an ascending order from the lowest RB in CORESET #0.

In step S102, the UE may determine the maximum number of RBs assignable by the above-described given DCI (for example, DCI format 1_0 that is CRC-scrambled by the particular RNTI and is monitored in CSS), based on the size (the number of RBs, bandwidth) of CORESET #0.

Here, the maximum number of RBs assignable by the above-described given DCI may be expressed in other words with the maximum bandwidth that can be allocated to the PDSCH by the given DCI.

On the other hand, if CORESET #0 is no configured for the UE (step S101, No), in step S103, the UE may start RB numbering for the PDSCH scheduled by the above-described given DCI (for example, DCI format 1_0 that is CRC-scrambled with a particular RNTI and is monitored in CSS) from the lowest RB in the above-described common CORESET.

In step S103, the UE may determine the maximum number of RBs assignable by the above-described given DCI (for example, DCI format 1_0 that is CRC-scrambled by the particular RNTI and is monitored in CSS), based on the size (the number of RBs, bandwidth) of the above-described common CORESET.

Note that although it is assumed that CORESET #0 is configured based on the MIB in step S101, CORESET #0 may be configured by any one of the MIB, the SIB1, or the RRC reconfiguration message. If CORESET #0 is not configured based on a particular higher layer message (for example, MIB) (even if CORESET #0 is configured in another higher layer message (for example the SIB1 or the RRC reconfiguration message)), the UE may perform step S103. Alternatively, if CORESET #0 is not configured by any higher layer message (for example, the MIB, the SIB, or the RRC reconfiguration message), the UE may perform step S103.

The determination of step S101 is not necessary, and the UE may start RB numbering for the PDSCH scheduled by the above-described given DCI (for example, DCI format 1_0 that is CRC-scrambled with a particular RNTI and is monitored in CSS) from the lowest RB in CORESET #0 or the common CORESET in accordance with a given criterion.

According to the first aspect, even if CORESET #0 is not configured, the UE can specify the frequency domain of the PDSCH scheduled by the above-described given DCI (for example, DCI format 1_0 that is CRC-scrambled with a particular RNTI and is monitored in CSS), based on the common CORESET.

Second Aspect

In a second aspect, similarly to the first aspect, the UE controls at least one of RB numbering for the PDSCH scheduled by given DCI and the maximum number of RBs assignable by the given DCI, based on whether or not CORESET #0 is configured.

On the other hand, in the second aspect, if CORESET #0 is not configured, the UE controls at least one of the above-described RB numbering and the above-described maximum number of RBs, based on an initial downlink bandwidth part (BWP), instead of the above-described common CORESET. In the following, differences from the first aspect will be mainly described.

Here, the initial downlink BWP may be configured based on a higher layer message (for example, RRC reconfiguration message or SIB1). For example, as shown in FIG. 2, the cell-specific common parameters (BWP-DownlinkCommon) provided for the initial downlink BWP may include information (location/bandwidth information, locationAndBandwidth) used for at least one (location/bandwidth) determination of the location and the bandwidth of the frequency domain of the initial downlink BWP.

The UE may determine the location/bandwidth of the initial downlink BWP, based on the location/bandwidth information (for example, locationAndBandwidth in pdcch-ConfigCommon in BWP-DownlinkCommon of FIG. 2) provided for the initial downlink BWP. Note that, in FIG. 2, locationAndBandwidth is included in pdcch-ConfigCommon in BWP-DownlinkCommon, but it may be included in any IE of any hierarchy.

Figure 4:
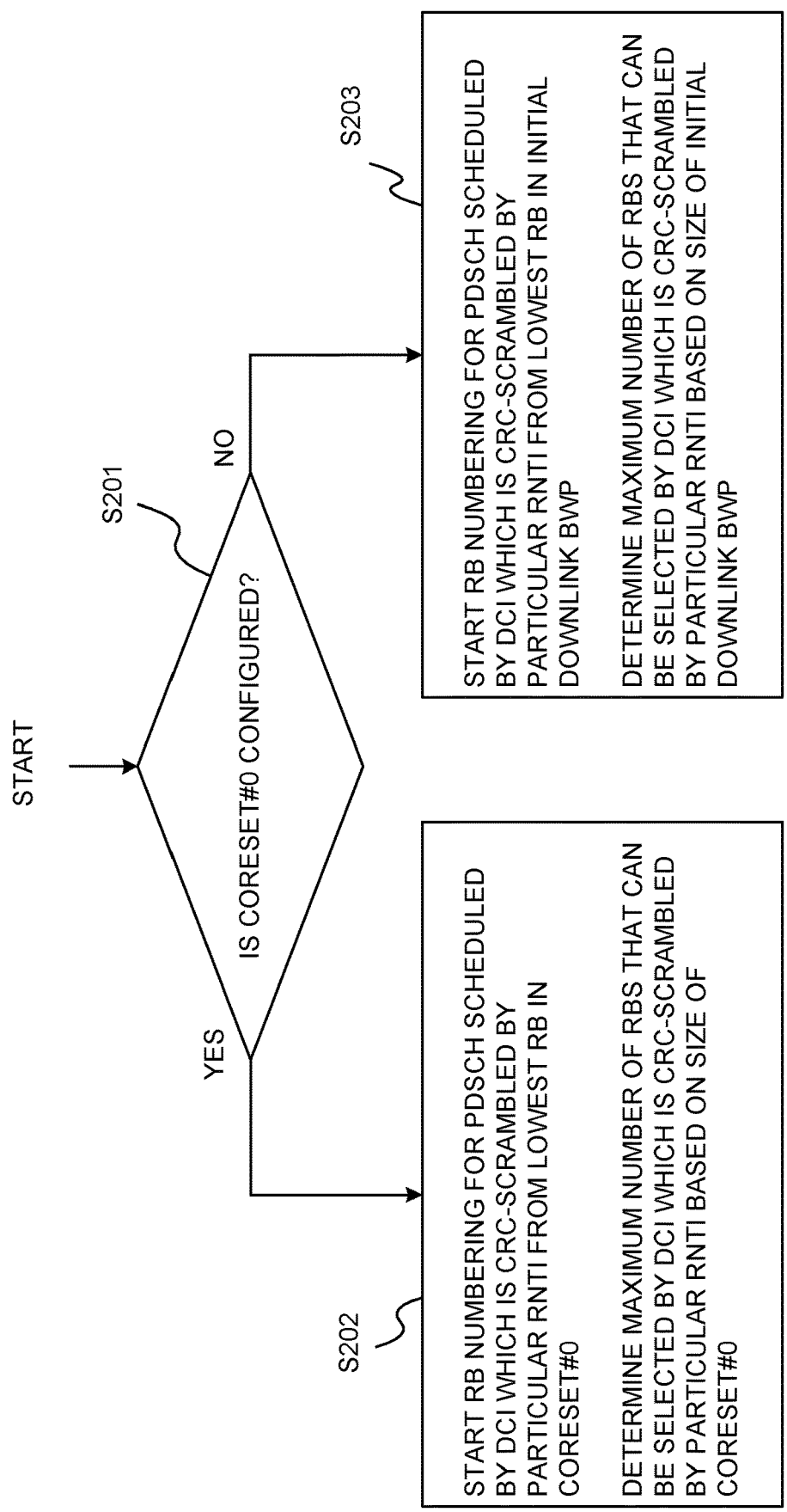
FIG. 4 is a diagram to show an example of control of RB numbering and the maximum number of RBs according to a second aspect.

FIG. 4 is a diagram to show an example of control of the RB numbering and the maximum number of RBs according to the second aspect. Steps S201 and S202 of FIG. 4 are similar to steps S101 and S201 of FIG. 2.

If CORESET #0 is no configured for the UE (step S201, No), in step S203, the UE may start RB numbering for the PDSCH scheduled by the above-described given DCI (for example, DCI format 1_0 that is CRC-scrambled with a particular RNTI and is monitored in CSS) from the lowest RB in the initial BWP. In other words, the UE may start the RB numbering from the lowest RB specified by the location/bandwidth information (for example, locationAndBandwidth of FIG. 2) provided for the initial downlink BWP.

In step S203, the UE may determine the maximum number of RBs assignable by the above-described given DCI (for example, DCI format 1_0 that is CRC-scrambled by the particular RNTI and is monitored in CSS), based on the size (the number of RBs, bandwidth) of the initial downlink BWP. In other words, the UE may determine the RB numbering, based on the size of the initial downlink BWP specified by location/bandwidth information (for example, locationAndBandwidth of FIG. 2) provided for the initial downlink BWP.

According to the second aspect, even if CORESET #0 is not configured, the UE can specify the frequency domain of the PDSCH scheduled by the above-described given DCI (for example, DCI format 1_0 that is CRC-scrambled with a particular RNTI and is monitored in CSS), based on the initial downlink BWP.

(Radio Communication System)

Hereinafter, a structure of a radio communication system according to one embodiment of the present disclosure will be described. In this radio communication system, any of the radio communication methods according to each embodiment of the present disclosure described above may be used alone or may be used in combination for communication.

Figure 5:
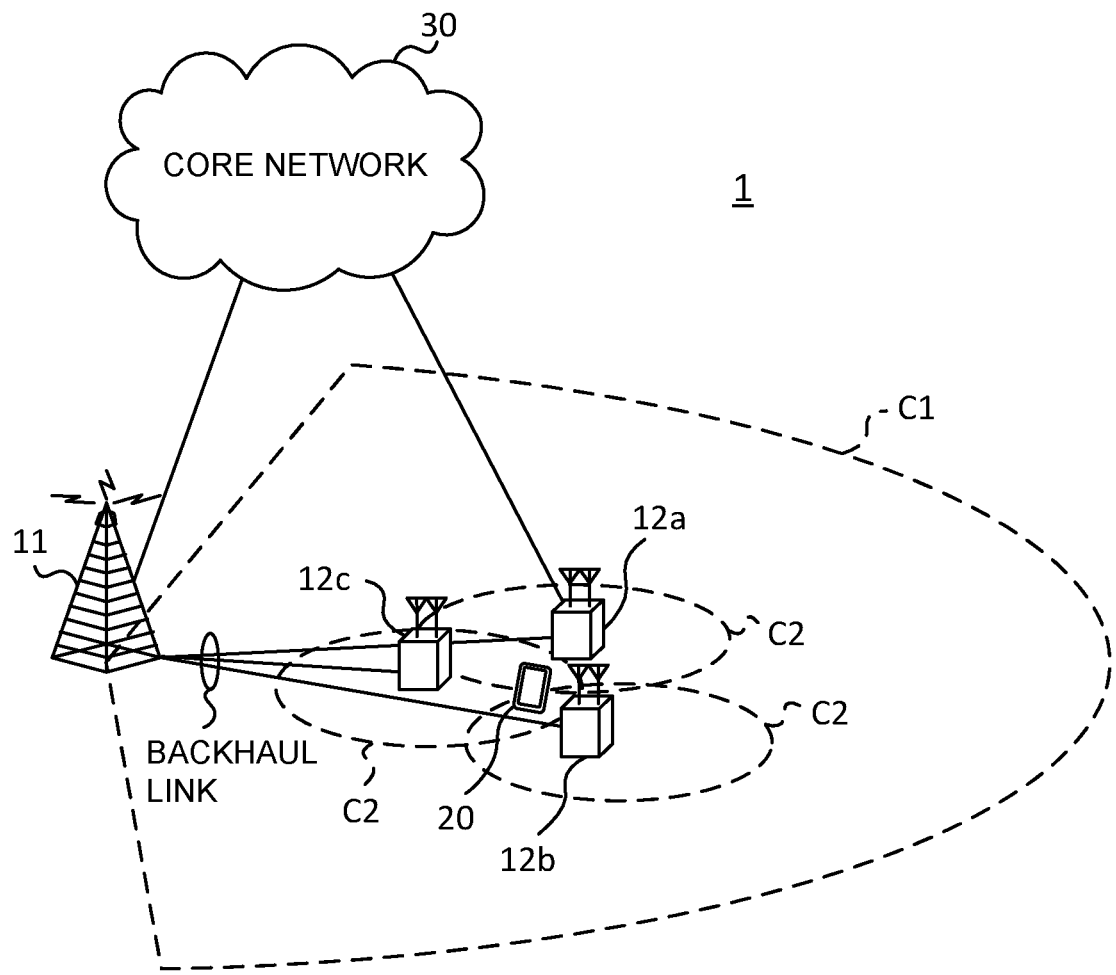
FIG. 5 is a diagram to show an example of a schematic structure of a radio communication system according to one embodiment.

FIG. 5 is a diagram to show an example of a schematic structure of the radio communication system according to one embodiment. The radio communication system 1 may be a system implementing a communication using LTE (Long Term Evolution), 5G NR (5th generation mobile communication system New Radio) and so on the specifications of which have been drafted by 3GPP (Third Generation Partnership Project).

The radio communication system 1 may support dual connectivity (multi-RAT dual connectivity (MR-DC)) between a plurality of RATS (Radio Access Technologies). The MR-DC may include dual connectivity (EN-DC (E-UTRA-NR Dual Connectivity)) between LTE (E-UTRA (Evolved Universal Terrestrial Radio Access)) and NR, dual connectivity (NE-DC (NR-E-UTRA Dual Connectivity)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NN-DC (NR-NR Dual Connectivity)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, or the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (FR1 (Frequency Range 1)) and a second frequency band (FR2 (Frequency Range 2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the CPRI (Common Public Radio Interface), the X2 interface and so on) or a wireless connection (for example, an NR communication). For example, if an NR communication is used as a backhaul between the base stations 11 and 12, the base station 11 corresponding to a higher station may be referred to as an "IAB (Integrated Access Backhaul) donor," and the base station 12 corresponding to a relay station (relay) may be referred to as an "IAB node."

The base station 10 may be connected to a core network 30 through another base station 10 or directly. For example, the core network 30 may include at least one of EPC (Evolved Packet Core), 5GCN (5G Core Network), NGC (Next Generation Core), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), CP-OFDM (Cyclic Prefix OFDM), DFT-s-OFDM (Discrete Fourier Transform Spread OFDM), OFDMA (Orthogonal Frequency Division Multiple Access), SC-FDMA (Single Carrier Frequency Division Multiple Access), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (PDSCH (Physical Downlink Shared Channel), which is used by each user terminal 20 on a shared basis, a broadcast channel (PBCH (Physical Broadcast Channel)), a downlink control channel (PDCCH (Physical Downlink Control Channel)) and so on, may be used as downlink channels.

In the radio communication system 1, an uplink shared channel (PUSCH (Physical Uplink Shared Channel), which is used by each user terminal 20 on a shared basis, an uplink control channel (PUCCH (Physical Uplink Control Channel)), a random access channel (PRACH (Physical Random Access Channel)) and so on may be used as uplink channels.

User data, higher layer control information, SIBs, and the like (System Information Blocks) are communicated on the PDSCH. User data, higher layer control information and so on may be communicated on the PUSCH. The MIBs (Master Information Blocks) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One SS may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Transmission confirmation information (for example, which may be also referred to as HARQ-ACK (Hybrid Automatic Repeat reQuest), ACK/NACK, and so on) of channel state information (CSI), scheduling request (SR), and so on may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SSB (SS Block)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 6:
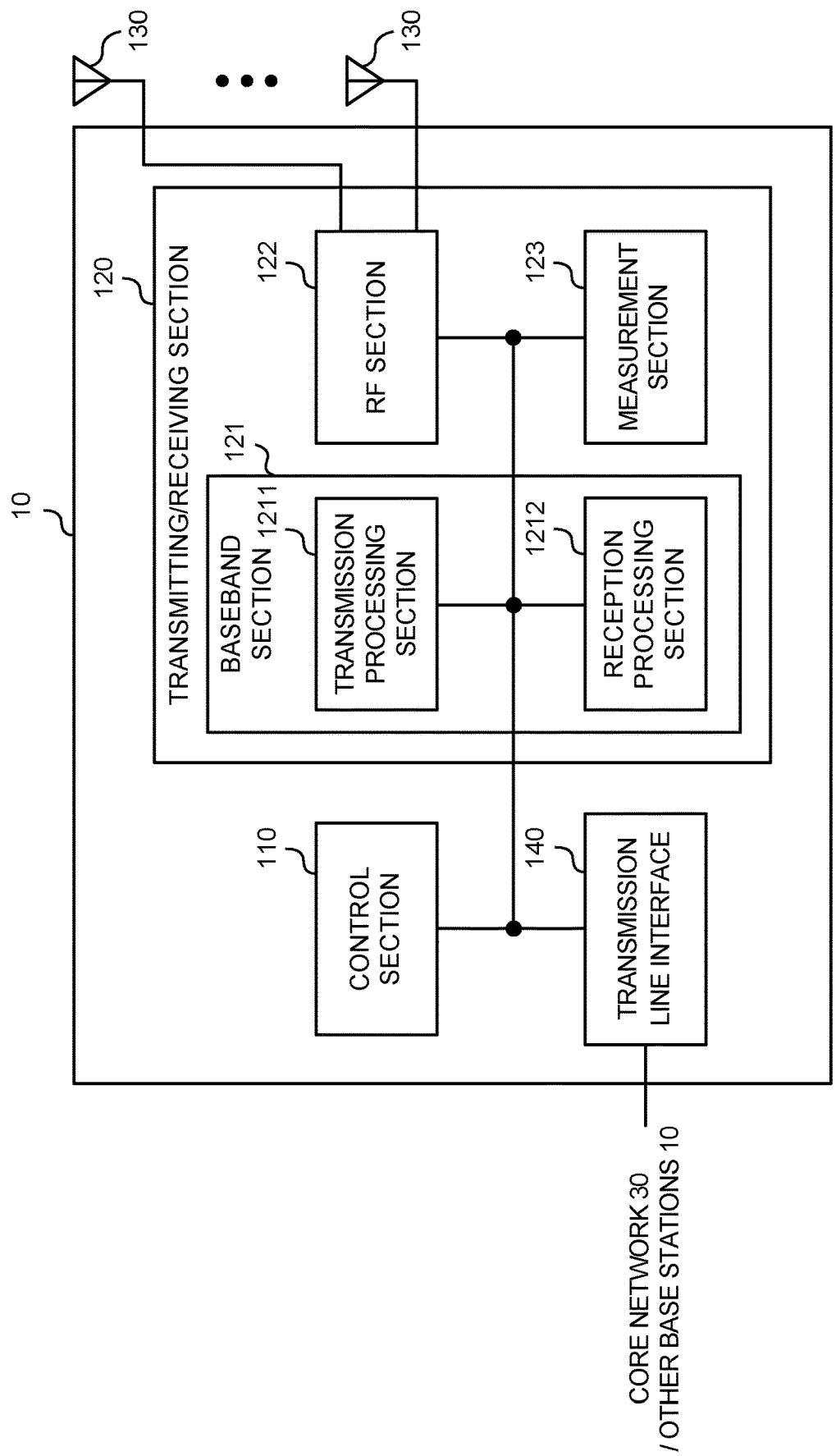
FIG. 6 is a diagram to show an example of a structure of a base station according to one embodiment.

FIG. 6 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing, and so on) for communication channels, manage the state of the base station 10, manage the radio resources, and the like.

The transmitting/receiving section 120 may include a baseband section 121, an RF (Radio Frequency) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may performs the processing of the PDCP (Packet Data Convergence Protocol) layer, the processing of the RLC (Radio Link Control) layer (for example, RLC retransmission control), the processing of the MAC (Medium Access Control) layer (for example, HARQ retransmission control), and so on, for example, on data and control information and so on acquired from the control section 110, and may generate bit string to transmit.

The transmitting/receiving section 120 (transmission processing section 1211) may performs transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform RRM (Radio Resource Management) measurement, CSI (Channel State Information) measurement, and so on, based on the received signal. The measurement section 123 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit at least one of a master information block (MIB), a system information block (SIB) 1, and an RRC reconfiguration message in a cell.

The transmitting/receiving section 120 transmits an uplink signal (for example, uplink control channel, uplink shared channel, DMRS, and so on). The transmitting/receiving section 120 receives a downlink signal (for example, downlink control channel, downlink shared channel, DMRS, downlink control information, higher layer parameter, and so on). Specifically, the transmitting/receiving section 120 may transmit downlink control information including a given field indicating frequency domain resources allocated to a downlink shared channel.

(User Terminal)

Figure 7:
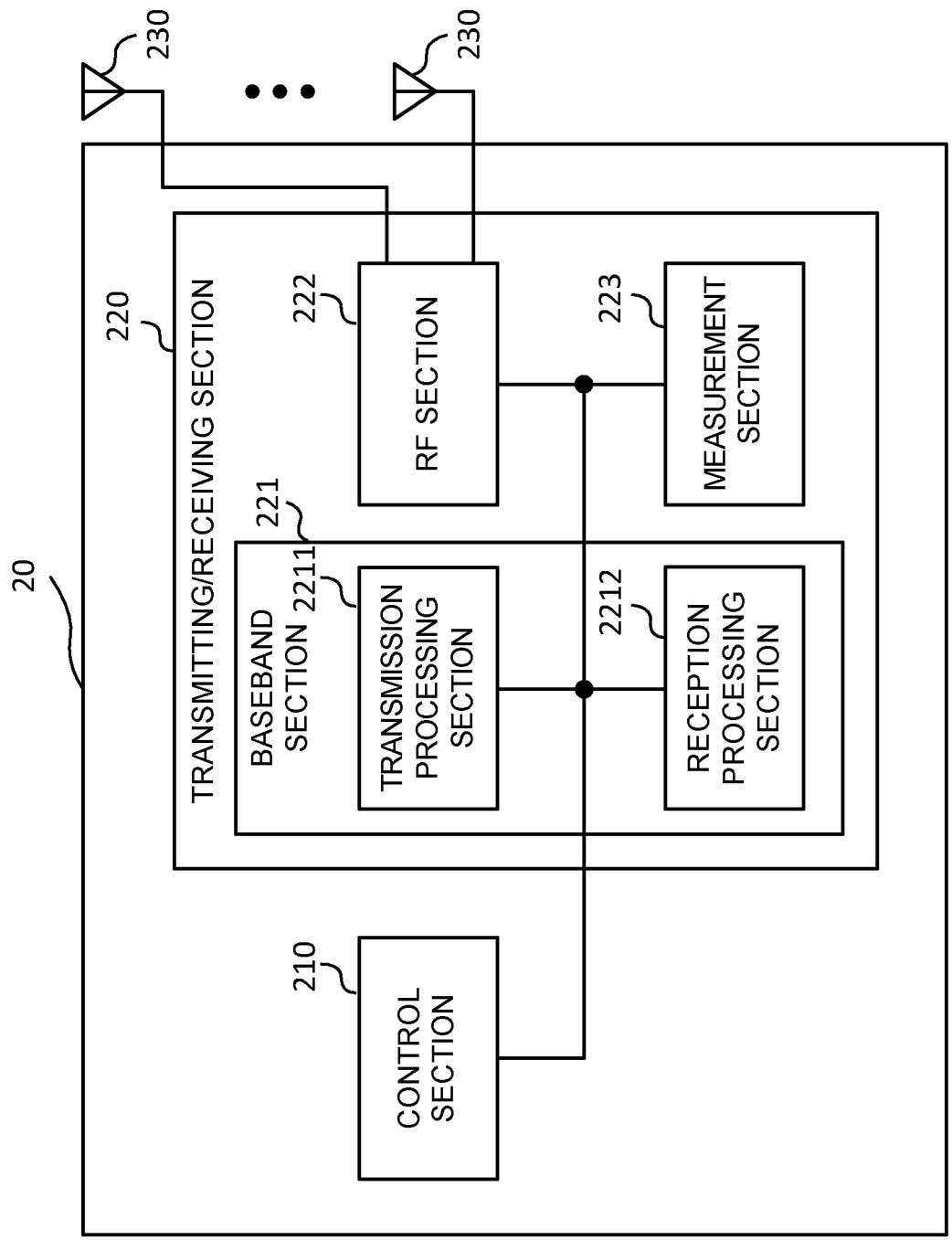
FIG. 7 is a diagram to show an example of a structure of a user terminal according to one embodiment.

FIG. 7 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may performs the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may performs transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

Note that the transmitting/receiving section 220 may receive at least one of a master information block (MIB), a system information block (SIB) 1, and an RRC reconfiguration message in a cell.

Note that the transmitting/receiving section 220 transmits an uplink signal (for example, uplink control channel, uplink shared channel, DMRS, and so on). In addition, the transmitting/receiving section 220 receives a downlink signal (for example, downlink control channel, downlink shared channel, DMRS, downlink control information, higher layer parameter, and so on). Particularly, the transmitting/receiving section 220 may transmit downlink control information including a given field indicating frequency domain resources allocated to a downlink shared channel.

Note that the transmitting/receiving section 220 monitors a common search space and receive the downlink control information in which a cyclic redundancy check (CRC) is scrambled with a particular radio network temporary identifier (RNTI).

The control section 210 may control at least one of the numbering of resource blocks for the downlink shared channel scheduled by the downlink control information and the maximum number of the resource blocks that can be specified by the downlink control information, based on whether or not the control resource set for the common search space is configured.

The control section 210 may start the numbering of the resource blocks from the lowest resource block in the common control resource set if the control resource set is not configured.

The control section 210 may determine the maximum number of the resource blocks, based on the size of the common control resource set if the control resource set is not configured.

The control section 210 may start the numbering of the resource blocks from the lowest resource block in the downlink bandwidth part for the initial access if the control resource set is not configured.

The control section 210 may determine the maximum number of the resource blocks, based on the size of the downlink bandwidth part for the initial access if the control resource set is not configured.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but functions are by no means limited to these. For example, functional block (components) to implement a function of transmission may be referred to as a "transmitting section (transmitting unit)," a "transmitter," and the like. The method for implementing each component is not particularly limited as described above.

Figure 8:
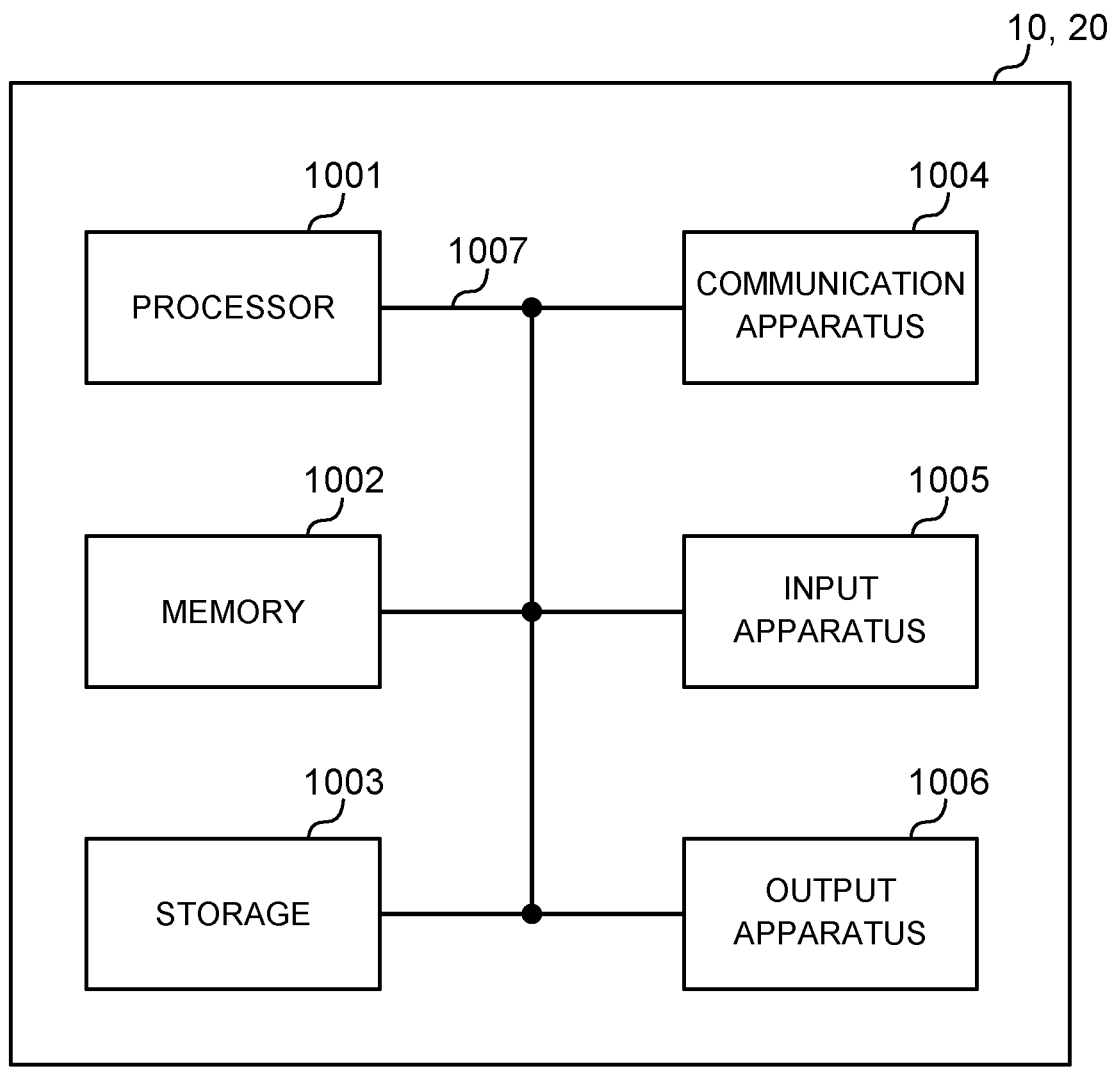
FIG. 8 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 8 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency," and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, codewords or the like, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. Since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding wait)," "quasi-co-location (QCL)," a "TCI state (Transmission Configuration Indication state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

(Supplementary Note)

Supplementary notes of the present disclosure are added. The following structures are suggested.

[Structure 1]

A user terminal including:
a receiving section that monitors a common search space to receive downlink control information with a cyclic redundancy check (CRC) scrambled with a specific radio network temporary identifier (RNTI); and
a control section that controls at least one of numbering of resource blocks for a downlink shared channel scheduled by the downlink control information and a maximum number of resource blocks that can be specified by the downlink control information, based on whether or not a control resource set for the common search space is configured.

[Structure 2]

The user terminal according to structure 1, wherein the control section starts the numbering of resource blocks from a lowest resource block in a common control resource set if the control resource set is not configured.

[Structure 3]

The user terminal according to structure 1 or 2, wherein the control section determines the maximum number of resource blocks, based on a size of a common control resource set if the control resource set is not configured.

[Structure 4]

The user terminal according to structure 1, wherein the control section starts the numbering of resource blocks from a lowest resource block in a downlink bandwidth part for an initial access determined based on a higher layer parameter if the control resource set is not configured.

[Structure 5]

The user terminal according to structure 1 or 4, wherein the control section determines the maximum number of resource blocks, based on a size of a downlink bandwidth part for an initial access determined based on a higher layer parameter if the control resource set is not configured.

[Structure 6]

A radio communication method of a user terminal including the steps of:
monitoring a common search space to receive downlink control information with a cyclic redundancy check (CRC) scrambled with a specific radio network temporary identifier (RNTI); and
controlling at least one of numbering of resource blocks for a downlink shared channel scheduled by the downlink control information and a maximum number of resource blocks that can be specified by the downlink control information, based on whether or not a control resource set for the common search space is configured.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The disclosure of Japanese Patent Application No. 2018-202309, filed on Oct. 10, 2018, including the specification, drawings and abstract, is incorporated herein by reference in its entirety.

What is claimed is:

1. A terminal comprising:
a receiver that monitors a common search space to receive downlink control information for scheduling a downlink shared channel; and
a processor that controls a maximum number of resource blocks assignable by the downlink control information based on whether a control resource set is configured by a parameter that is in a master information block (MIB),
wherein if the control resource set is configured by the parameter in the MIB, then the processor determines the maximum number based on a size of the control resource set,
if the control resource set is not configured by the parameter in the MIB, then the processor determines the maximum number based on a size of an initial downlink bandwidth part (BWP),
the size of the initial downlink BWP is provided by information that determines at least one of a location and a bandwidth provided for the initial downlink BWP, and
the information is included in a radio resource control (RRC) reconfiguration message.

2. The terminal according to claim 1, wherein the downlink control information is cyclic redundancy check (CRC) scrambled by a Cell(C)-Radio Network Temporary Identifier(RNTI), a Configured Scheduling(CS)-RNTI, or a Random Access(RA)-RNTI.

3. A radio communication method for a terminal comprising:
monitoring a common search space to receive downlink control information for scheduling a downlink shared channel; and
controlling a maximum number of resource blocks assignable by the downlink control information based on whether a control resource set is configured by a parameter that is in a master information block (MIB),
wherein in response to the control resource set being configured by the parameter in the MIB, the maximum number is determined based on a size of the control resource set,
in response to the control resource set being not configured by the parameter in the MIB, the maximum number is determined based on a size of an initial downlink bandwidth part (BWP),
the size of the initial downlink BWP is provided by information that determines at least one of a location and a bandwidth provided for the initial downlink BWP, and
the information is included in a radio resource control (RRC) reconfiguration message.

4. A base station comprising:
a processor that controls a maximum number of resource blocks assignable by a downlink control information for scheduling a downlink shared channel, based on whether a control resource set is configured by a parameter that is in a master information block (MIB); and
a transmitter that transmits the downlink control information in a common search space, wherein if the control resource set is configured by the parameter in the MIB, then the processor determines the maximum number based on a size of the control resource set, if the control resource set is not configured by the parameter in the MIB, then the processor determines the maximum number based on a size of an initial downlink bandwidth part (BWP), the size of the initial downlink BWP is provided by information that determines at least one of a location and a bandwidth provided for the initial downlink BWP, and the information is included in a radio resource control (RRC) reconfiguration message.

5. A system comprising:

a terminal that comprises:
- a receiver that monitors a common search space to receive downlink control information for scheduling a downlink shared channel;
- a processor that controls a maximum number of resource blocks assignable by the downlink control information based on whether a control resource set is configured by a parameter that is in a master information block (MIB), wherein if the control resource set is configured by the parameter in the MIB, then the processor determines the maximum number based on a size of the control resource set, if the control resource set is not configured by the parameter in the MIB, then the processor determines the maximum number based on a size of an initial downlink bandwidth part (BWP), the size of the initial downlink BWP is provided by information that determines at least one of a location and a bandwidth provided for the initial downlink BWP, and the information is included in a radio resource control (RRC) reconfiguration message; and a base station that comprises:
- a processor that controls the maximum number based on whether the control resource set is configured by the parameter; and
- a transmitter that transmits the downlink control information in the common search space.

* * * * *